United States Patent [19]
Radcliffe et al.

[11] 3,819,016
[45] June 25, 1974

[54] VEHICLE BRAKING SYSTEM

[75] Inventors: Stanley L. Radcliffe, Stow, Ohio; Arthur E. Dornan, Ann Arbor, Mich.

[73] Assignee: Massex-Ferguson Inc., Detroit, Mich.

[22] Filed: Feb. 22, 1972

[21] Appl. No.: 227,836

[52] U.S. Cl............... 188/82.6, 188/82.3, 188/77, 188/110, 192/41 R, 192/80
[51] Int. Cl............................................. F16d 63/00
[58] Field of Search .......... 188/82.1, 82.3, 82.6, 77, 188/30, 61, 110, 346; 192/41 R, 80

[56] References Cited
UNITED STATES PATENTS

| | | | |
|---|---|---|---|
| 1,600,626 | 9/1926 | Ford et al. | 188/30 |
| 2,050,759 | 8/1936 | Lyons | 188/30 X |
| 2,218,826 | 10/1940 | Miller | 192/80 X |
| 2,471,346 | 5/1949 | Peterson et al. | 188/82.6 X |
| 2,600,065 | 6/1952 | McIntyre | 188/82.6 X |
| 2,677,441 | 5/1954 | Roberts | 188/77 R X |
| 2,709,506 | 5/1955 | Cilley | 188/77 R X |

FOREIGN PATENTS OR APPLICATIONS

| 725,442 | 3/1955 | Great Britain | 188/77 R |
|---|---|---|---|

*Primary Examiner*—George E. A. Halvosa
*Attorney, Agent, or Firm*—Thomas P. Lewandowski

[57] ABSTRACT

A braking system for vehicles to prevent rearward movement of the vehicles without action by the driver when the vehicle is not being driven rearwardly, particularly useful on vehicles having loads applied to them in the rearward direction, includes a linkage operatively associated with a brake, which linkage is responsive to reverse motion of the vehicles, to cause engagement of the linkage and energization of the brake to prevent rearward movement of the vehicles. Control means, such as a clutch, responsive to rearward movement of the vehicle may be used to selectively energize and de-energize the brake.

6 Claims, 11 Drawing Figures

VEHICLE BRAKING SYSTEM

In braking systems for preventing rearward movement of a vehicle, it is desirable that the brake be activated upon the occurrence of such rearward movement without a requirement of an act on the part of the driver of the vehicle. Otherwise, the driver is required to initiate the braking of the vehicle in a manner similar to that required in bringing the vehicle to a stop.

The stopping brakes on a vehicle are normally self-energizing in the forward direction and, therefore, are undesirable for use in stopping rearward motion of the vehicle because a substantial increase in the amount of force to be applied in stopping rearward motion over that for stopping forward motion is required. Further, the driver is required to maintain the increased force without a letup as long as the rearward force on the vehicle continues to be applied.

In systems using the rearward movement of the vehicle to activate a brake independent of an act of the driver, which brake is self-energizing in the rearward direction, the brake is normally released by forward movement of the vehicle. Where the rearward load on the vehicle is applied externally, as on vehicles having loads applied by rear mounted winches and the vehicle is in a position preventing forward movement, there is no way to release the brake.

The present braking system incorporates a self-actuating brake to prevent rearward movement. Provisions for releasing the brake to permit the vehicle to be driven in reverse without first moving forward are also provided.

In one embodiment of the invention, the force received by the brake is divided by a linkage which permits only a portion of the force required to brake to a stop to be applied to the brake actuator with the balance of the force transmitted to the more substantial frame or body portions of the vehicle. The result of dividing the brake force is a brake capable of controlled slippage under overload conditions and more sensitive brake control using small more economical components, together with longer brake life and smoother operation.

The present invention relates to braking systems and more particularly to vehicle braking systems for preventing rearward movement of the vehicle independent of the brakes normally used to stop the vehicle which are actuated by the driver. The braking system includes means for interrupting movement of a drive member which interconnects the transmission of the vehicle with the ground engaging members such as wheels for driving the vehicle relative to the ground. The drive member transmits power supplied to the transmission by an engine to the vehicle wheels. Positive connection of the drive member to the wheels results in the wheels being stopped when movement of the drive member is stopped by the interrupting means. The interrupting means is attached to the drive member and may include a brake made up of a wheel and brake band, ratchet wheel and detent, or similar components. A linkage is connected to the brake, generally supporting the brake band or detent, and is mounted upon the drive member. Movement of the drive member may, therefore, be transmitted to the linkage which may be made responsive to such movement. For example, where the drive member is a drive shaft, the linkage may include a housing journalled to the shaft for movably supporting the brake band encompassing the brake wheel affixed to the drive shaft. Rotation of the drive shaft imparts a torque to the housing which changes direction with a change in rotation of the drive shaft. The change in rotation from a forward or standstill condition to reverse rotation results in a change in direction of the torque on the housing which is transmitted through the members of the linkage. The linkage movement permits contact to be made by the linkage with engaging means causing the linkage to energize the brake by frictional engagement of the band with the wheel.

The engaging means may include an anchor having a piston within a load chamber connected to the linkage by a link therein for applying loads received by the linkage from the brake band to the load chamber. The load chamber has provisions for unloading the force thereon to de-energize and thereby release the brake band.

Means for actuating the linkage may be provided, for example, a fluid cylinder interconnecting at least two members of the linkage to initiate braking or friction contact between the brake band and wheel.

Where it is desirable to retain the braking system inoperative under certain conditions of vehicle operation, control means may be provided to prevent energization of the load chamber or the fluid cylinder. The control means may include a control element for de-energizing the load chamber attached to and positioned by a second linkage attached to a shifting means, a shift lever, for example, on the transmission. Further, a second control element which is responsive to reverse motion of the drive member may be incorporated into the braking system, such as a control valve, for directing pressurized fluid from the power source to the fluid cylinder. Means for positioning the control valve, such as a friction clutch having a first member supported on the drive member of the vehicle and a second member attached to the movable control element, provide for proper movement of the valve by a frictional force created between the first and second members which are in frictional engagement.

The braking system provides a self-actuating brake for automatically preventing reverse or backward movement of the vehicle and eliminates the requirement of an act by the vehicle driver to prevent such movement. The brake can be released without forward movement of the vehicle. Controls for the brake make the brake responsive to reverse motion of the vehicle while the controls are also capable of retaining the brake inoperative under preselected conditions.

In one form of the braking system, the controls are responsive to backward motion of the vehicle as well as the brake itself allowing the load received by the brake to be divided between the control elements which initiate the braking action and the brake itself which receives the maximum force applied. The result of the above division of force is accurate and sensitive control coupled with rugged brake components to provide a braking system particularly suitable to heavy service.

Figure 1:
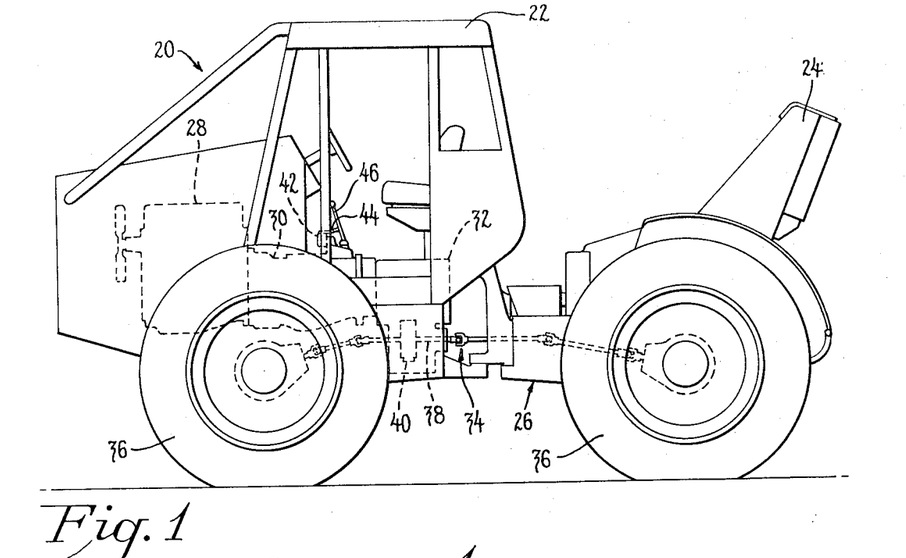
FIG. 1 is an elevational view of a forestry log skidder having a braking system in accordance with the present invention.

Referring to FIG. 1, a vehicle, for purposes of illustration shown as a skidder, is indicated generally by the numeral 20 having a cab 22 and winch 24 mounted on a frame 26. The frame 26 supports an engine 28, transmission 30, gear box 32 and drive linkage 34. The engine 28 provides power to drive the skidder 20 which power is transmitted through the transmission 30, gear box 32 and drive linkage 34 to ground engaging members, wheels 36, all of which may be driven as illustrated, or some of which may be driven, for instance only the rear wheels 36.

The drive linkage illustrated has a plurality of drive members one of which, drive shaft 38, supports a brake 40. The drive shaft 38 is positively interconnected to the wheels 36 by the remaining drive members in the drive linkage 34 so that stopping movement of the drive shaft also causes the wheels 36 to stop.

The brake 40 is a principle element of the braking system. The braking system also includes control components. Some of the control components are illustrated in FIG. 1, the directional valve 42 mounted on the transmission 30 and the linkage 44 connecting it to the transmission shift lever 46 are specific examples.

Figure 2:
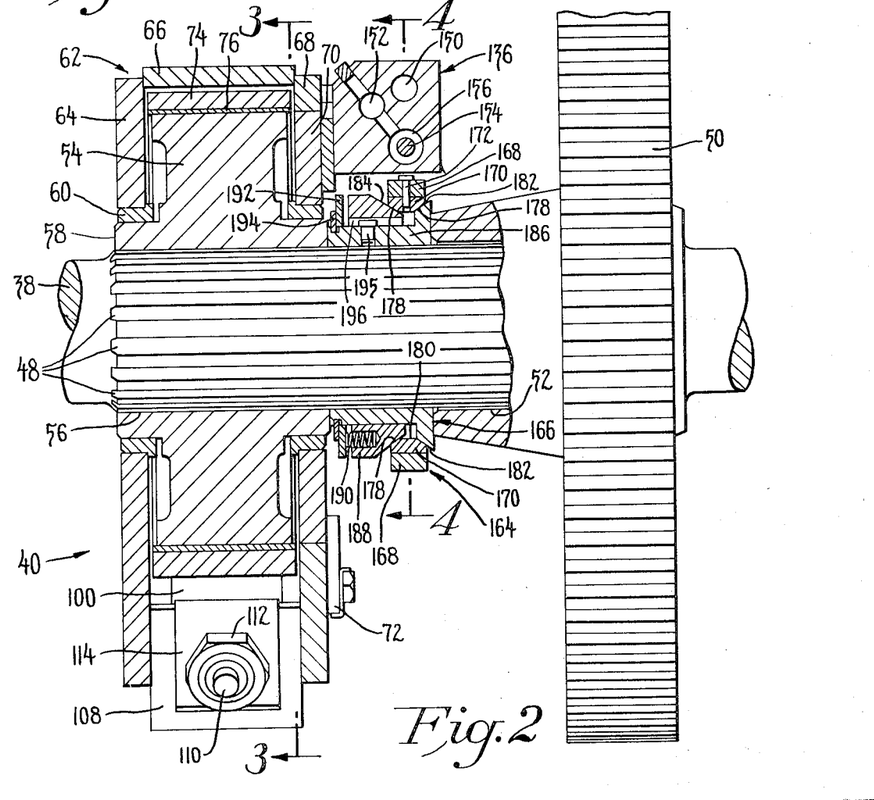
FIG. 2 is an enlarged sectional view of a portion of the braking system illustrated on the skidder in FIG. 1 including fragmentary portions of associated parts of the skidder.
Figure 3:
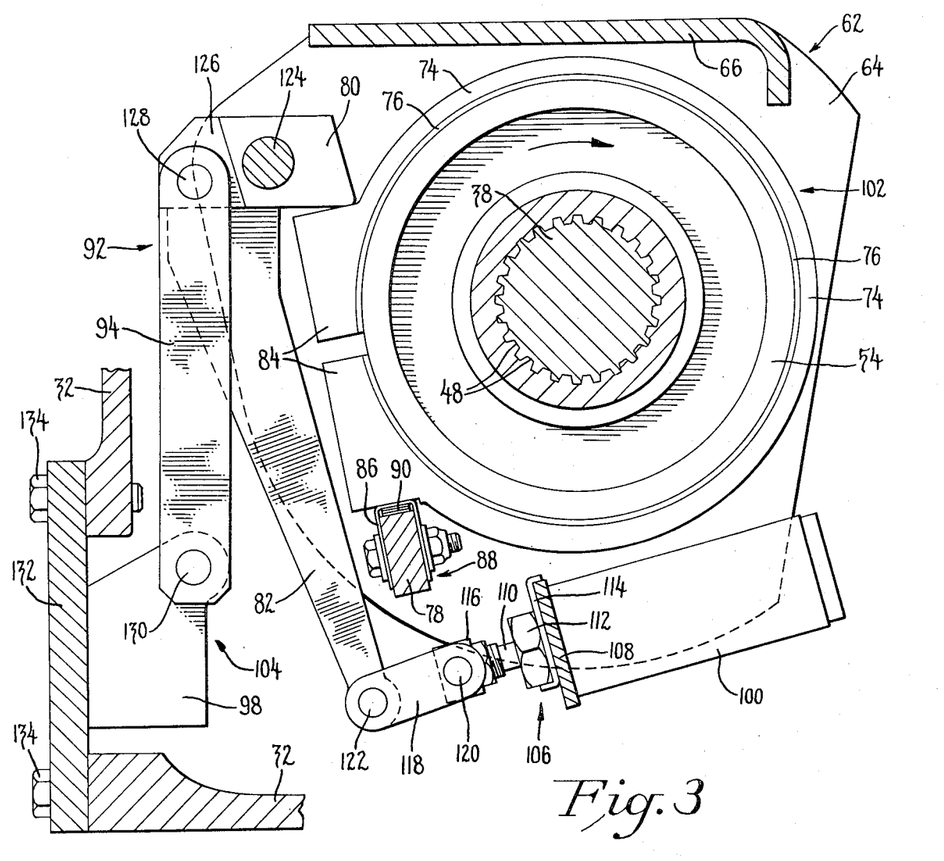
FIG. 3 is a sectional view of the apparatus illustrated in FIG. 2 taken along line 3—3 thereof.
Figures 4, 5:
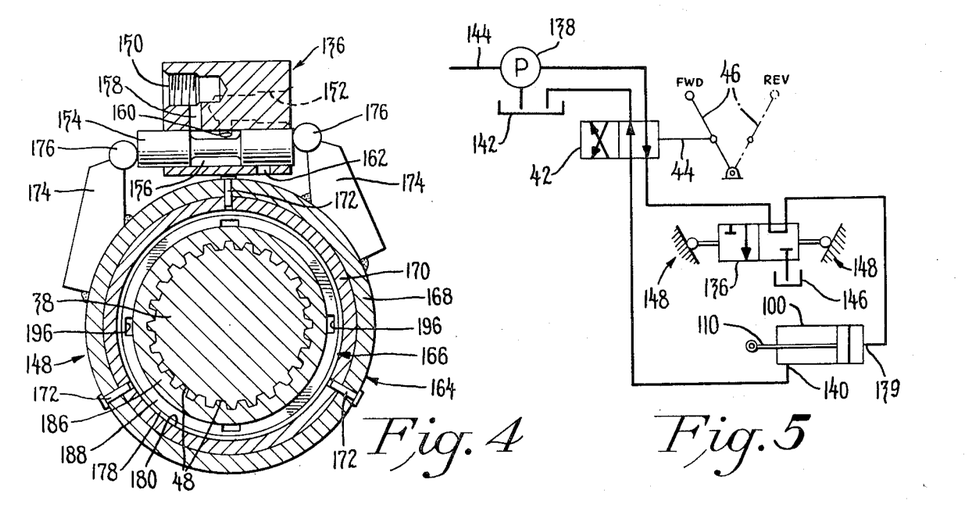
FIG. 4 is a sectional view of the apparatus illustrated in FIG. 2 taken along line 4—4 thereof.
FIG. 5 is a schematic of controls for the braking system illustrated in FIG. 1.

FIGS. 2, 3 and 4 illustrate the brake in greater detail, and FIG. 5 is a schematic of the control components wherein the directional valve 42 and linkage 44 are shown. FIGS. 2, 3 and 4 illustrate the splines 48 on the drive shaft 38 by which the gear 50 having mating splines 52 transmits power to the drive shaft 38. Similarly, the brake wheel 54 also has mating splines 56 whereby motion of the drive shaft 38 is imparted to the wheel 54 and any force applied to the wheel 54 in turn is applied to the drive shaft 38. The wheel 54 has a hub 58 journalled to a pair of bushings 60. The bushings 60 are press fit into the housing 62 to allow rotational movement of the wheel 54 relative to the housing 62. The housing 62 includes a back plate 64, top plate 66, front plate 68 and cover plate 70. Typically, the housing is of a welded construction with the cover plate 70 being removable to give access to the wheel 54. A number of spaced apart tabs 72, one illustrated, are bolted to the housing 62 to retain the cover plate 70 flush with the housing 62.

The housing 62 encloses the brake wheel 54 and a brake band 74 substantially encompassing the outer periphery of the wheel 54. In between the band 74 and wheel 54 is a liner 76 which is bonded to band 74. As best illustrated in FIG. 3, the band 74 is prevented from rotating in one direction by a stop 78 and in the other direction by a head portion 80 of an arm 82 both of which are attached to the housing 62. The head portion 80 and stop 78 engage the terminal portions 84 of the band 74. Converging the terminal portions 84 upon one another reduces the internal diameter of the band 74 resulting in frictional engagement between the wheel 54 and the liner 76. With the band 74 restrained from rotating, the frictional engagement between the liner 76 attached to the band 74 and the moving wheel 54 causes the wheel 54 to be slowed by a force counter to the rotation of the wheel 54. If the force is increased sufficiently, the wheel 54 may be quickly brought to a stop. The liner 76 is selected based upon its ability to resist wear and for its high coefficient of friction to provide large stopping forces.

The stop 78 is provided with a retainer 86 attached thereto by a bolted connection 88 in a manner allowing the retainer 86 to be adjusted relative to the stop 78 to accommodate a number of shims 90. A sufficient number of shims 90 are provided to bring the terminal portions 84 close enough to one another by positioning them between the stop 78 and head portion 80 to prevent excessive movement in the linkage when the brake is energized.

To better understand the brake 40, it can be viewed as being divided into means for interrupting movement of the drive shaft 38 including the wheel 54, band 74 and liner 76; the linkage 92 including the housing 62, stop 78, arm 82 and links 94; means for engaging the linkage 92 including anchor 98; and means for actuating the linkage 92 including a fluid motor 100. The interrupting means are denoted generally in FIG. 3 by the numeral 102, the engaging means by numeral 104 and the actuating means by the numeral 106.

In the simplest sense, the brake 40 is actuated upon reverse or backward movement of the drive shaft 38 imparted to it by the wheels 36. The reverse movement, counterclockwise in FIG. 3, triggers the actuating means 106 causing initial actuation of the linkage 92 to energize the interrupting means 102 further causing the linkage to be operatively engaged by the engaging means 104 thereby causing the linkage 92 to bear on the interrupting means 102 and provide full energization of the interrupting means 102.

More particularly, the fluid motor 100 being affixed to the housing 62 by the plate 108, interconnecting the front and back plates 68 and 64, actuates the linkage 92 by extension of its rod 110. The fluid motor 100 is attached to the plate 108 by the nut 112 and tab lock 114. A clevis 116 at the end of the rod 110, pivotally attached by a pin 120 and a short link 118 to the arm 82 by a pin 122, allows the linear motion of the extending rod 110 to be transformed into curvilinear motion of the arm 82. The arm 82 pivots about a pin 124 affixed to the front and back plates 68 and 64 of the housing 62. Indentations 126 on each side of the head portion 80 of the arm 82 permit a pair of links 94, one illustrated in FIG. 3, to be pivotally mounted by a pin 128 on the head portion 80 flush with the outermost sides of the head portion to allow the links to pass between the front and back plates 68 and 64. Since the links 94 are also pivotally mounted to the anchor 98, by a pin 130 they are free to pivot about the anchor 98 as the arm 82 is moved by the fluid motor 100. The small distance between the centers of the pins 124 and 128 in the head portion 80 and upper portion of the links 94 results in very little swing by the links 94 which remain generally vertical.

The clockwise movement of the arm 82 causes like movement of the head portion 80 to further engage one of the terminal portions 84 of the band 74 forcing it toward the mating terminal portion 84 which is restrained by the stop 78. The converging of the terminal portions 84 increases the frictional force between the band liner 76 and the wheel 54 to cause the wheel 54 to tend to further engage the liner 76 in a manner characteristic of self-actuating brakes. The counterclockwise movement imparted to the band 74 by the wheel 54 is also transmitted to the stop 78. Any force transmitted to the stop 78 tends to cause counterclockwise movement of the housing 62 which is resisted by the links 94 acting against the anchor 98 attached in a stationary manner to the cover 132 and by bolted connections 134 to the gear box 32. The force is transmitted from the housing 62 to the links 94 through the common connection of the pins 124 and 128 in the head portion 80 of the arm 82. Since the pin 124 supporting the arm 82 is affixed to the housing 62, a moment arm equal to the distance between the centers of the pins 124 and 128 applies a torque to the head portion 80 resulting from the reactive force applied to the links 94 by the pin 128. The torque on the head portion 80 causes further engagement of the terminal portions 84 by the head portion so that the braking force of the band 74 on the wheel 54 rapidly increases to bring the wheel 54 to a stop and resist any further forces applied thereto.

It should be noted that the amount of movement of the links 94 and the housing 62 is very small, being only a few degrees of angular displacement, and that the links 94 remain generally vertical causing little or no moment to arise about the pin 130 which would otherwise tend to bind the linkage 92 and increase the load carrying requirements on the links 94.

Comparing the moment arm between the pins 124 and 128 in the head portion 80 with the moment arm provided by the arm 82 having a force applied by the fluid motor 100, it can be seen that the arm 82 is a larger moment arm giving greater mechanical advantage to the force received from the fluid motor 100 in applying the force thru the head portion 80 to the terminal portion of the band 74. Thus, the force required to be produced by the fluid motor 100 is reduced. Further the fluid motor 100 only receives a portion of the braking force on the brake 40 while the linkage 92 transmits the remaining portion of the force required to brake the wheel 54 to the anchor 98. Thus, the force required from the fluid motor 100 is further reduced.

The division of the forces in the linkage 92 between the arm 82 and links 94 permits the links 94 to be designed in conjunction with the linkage 92 in a manner permitting controlled slippage of the brake 40 under overload conditions. Where only a stationary anchor is provided on self-energizing brakes, the linkage provided must be designed not to slip because once slipping occurs there is no control over the braking effect and the brake fails when the slip condition is reached. Thus, without the division of forces the links 94 would be designed to increase the braking force applied in proportion to the force received by the brake 40 without any limit on the braking force applied. The mechanism is, in effect, a lock under these conditions, and overloads of an unanticipated magnitude on the mechanism result in binding and destructive forces being applied to the mechanism unless it is substantially oversized to anticipate the most extreme load.

By supplementing the links 94 with the arm 82, the combined forces can be designed to brake all forces anticipated under normal usage. The links 94 are designed to allow the brake 40 to slip under overload conditions, but the slippage is controlled by the force applied by the fluid motor 100 through the arm 82 of the linkage 92.

The force applied by the arm 82 of the linkage 92 is a constant force which does not vary with the force received by the brake 40. The constantly applied force of the arm 82 of the linkage 92 does not increase with an increase in force received by the brake, but maintains the same force being applied through the arm 82 by the fluid motor 100. Thus, in an overload condition where the force received by the brake is sufficient to cause slippage against the force applied by the links 94, the constant force applied through the arm 82 governs the amount of slippage and restores the braking or static conditions when the force received by the brake is dissipated by the high energy absorbtion of the slippage and/or the force received is reduced to a magnitude below the overload conditions.

The point at which overload occurs can be preselected on the basis of when slippage is allowed with the governing characteristics in the brake 40 including the length of the arm 82 the force applied by the cylinder, the ratio of the force applied to the cylinder to that of the links 94 and the length of the moment arm for the links 94.

It should be noted that the moment arms for the force on the pin 128 and the force applied by the head portion 80 are significant in release of the brake 40. The moment arms for the pin 128 and head portion 80 are defined by the distances between the center of pin 124 (FIG. 3) and the center of pin 128 and the distance to a line passing through the point of tangency between the head portion 80 and terminal portion 84, which the head portion engages respectively. As the ratio of the moment arm for the pin 128 to the moment arm for the head portion 80 increased beyond a given point, it was found that the brake 40 was difficult to release, and that as the ratio decreased beyond a given point slippage occurred at the lower torque levels. It was further determined that the above problems were minimized within a working range, for the brake 40 illustrated in FIGS. 2 through 4, wherein the valve of the ratio of the moment arms was generally between 1.0 and 1.2.

The actuating means 106 for the linkage 92 is illustrated as a fluid motor 100 of the cylinder type which is double acting, see FIG. 5. Fluid flow to the cylinder 100 is controlled by a control valve 136, illustrated schematically in FIG. 5. The control schematic illustrated in FIG. 5 is one example of means for controlling the braking system wherein pressurized fluid is furnished from a power source such as a pump 138 through first and second control elements, such as the directional and control valves 42 and 136, respectively, to the the inlet of the cylinder 100 thereby extending the rod 110. Fluid is discharged from the cylinder 100, upon extension of the rod 110, through the outlet 140 returning through the directional valve 42 to a reservoir 142 from where the fluid may be withdrawn by the pump 138 for reuse. Because of the small demand by the cylinder 100 for fluid resulting from the division of forces in the linkage 92 described above, the power source may be only a small diversion of the flow of fluid from the pump 138 with the main flow directed to a main outlet 144 such as that supplying fluid for a power transmission.

It should be noted that the directional valve 42 can be shifted by the shift lever 46 connected to the valve 42 by the linkage 44 (also illustrated in FIG. 1) to bypass the control valve 136 by switching the flow of fluid from the inlet 139 to the outlet 140 of the cylinder 100 when the shift lever 46 is in the reverse position and the spool of the directional valve 42 has shifted to the right in FIG. 5. Flow from the cylinder 100 is discharged from the inlet 139 through the control valve and back to the reservoir 142. Thus, the cylinder 100 is always retracted when the shift lever 46 is in the reverse position. In all other positions of the shift lever 46, the control valve 136 is operative to pass fluid to the inlet 139 of the cylinder 100 when the spool therein is positioned as illustrated in FIG. 5. Moving the spool to the right stops the flow of fluid to the cylinder 100 and allows the flow of fluid from the inlet 139 in the direction of the arrow on the control valve 136 to a sump 146 to relieve the pressure on the cylinder 100.

Means for positioning the spool of the control valve 136 responsive to reverse movement of the drive shaft 38 is illustrated schematically in FIG. 5 as denoted generally by the numeral 148 with a specific embodiment illustrated in FIG. 4 together with a specific embodiment of a control valve 136. The control valve 136 is also illustrated in FIG. 2 having an inlet port 150 and outlet port 152. A spool 154 is slidable within a bore 156 which interconnects the ports 150 and 152 through passages 158 and 160 leading from the inlet and outlet ports 150 and 152 respectively. The spool 154 is illustrated in FIG. 4, shifted to the left to allow flow from the inlet to the outlet port, 150 and 152, through the passages 158 and 160 and bore 156. Shifting the spool to the right blocks passage 158 and the inlet port 150, and allows flow through the passage 160 connected to the outlet port 152 to the relief port 162 to "dump" the fluid in the fluid motor 100 as described with respect to the control schematic of FIG. 5.

Shifting of the spool 154 is accomplished by the positioning means 148 illustrated in the form of a friction clutch in FIGS. 2 and 4 including first and second members frictionally engaged with one another such as a ring assembly 164 and hub assembly 166, respectively. The ring assembly 164 has an outer ring 168 and an inner ring 170 attached by suitable fasteners 172. The outer ring 168 has a pair of lugs 174 attached to it with knobs 176 on the ends thereof engaging the spool 154 to present a smooth surface for sliding engagement with the ends of the spool 154 in shifting the spool 154 back and forth.

Impetus is provided to the ring assembly 164 from the hub assembly 166, to shift the spool 154, through the inner ring 170 which is a wear surface in frictional contact with the hub assembly 166 and supported by the hub assembly 166 which in turn is supported by and splined to the drive shaft 38 and rotates in unison with it. The inner ring has two wear surfaces 178 on its inner circumferential surface 180 which surfaces 178 are inclined toward the outside of the ring assembly 166 as they extend outwardly from generally the center of the circumferential surface 180. The wear surfaces 178 mate flush with the inclined surfaces 182 and 184 on the hub 186 and cone 188 respectively. The inclination of the mating surfaces 178, 186 and 188 center the ring assembly 164 relative to the hub assembly 166 to maintain alignment of the ring assembly 164 at all times. When the hub assembly 166 rotates with the drive shaft 38, a friction force arises between the mating surfaces 178, 186 and 188 which tends to rotate the ring assembly 164. The lugs 174 limit the travel of the ring assembly 164 to that of the spool 154. In comparison to the movement of the housing 62 on the wheel 54 the travel of the ring assembly 164 is substantially larger, and the travel of the control valve 136 mounted thereon results in a difference in travel between the control valve 136 and the ring assemby 164 being sufficient to shift the spool 154. Only a small fraction of a revolution of the ring assembly 164 is required to shift the spool 154 making the response to a change in direction of rotation of the drive shaft 38 by the clutch almost instantaneous. Therefore, the slightst reverse movement of the drive shaft 38 will result in a shift of the spool 154 to the left as illustrated in FIGS. 4 and 5 resulting in energization of the brake, as described above, whenever the shift lever 46 is not in the reverse position.

To compensate for wear on the inner ring 170 and to assure sufficient frictional engagement between the assemblies 164 and 166, the cone 188 is biased toward the ring assembly 164 by a number of springs 190, one illustrated, spaced over the annular face of the cone 188 opposite the face adjacent the ring assembly 164. Any suitable means for biasing may be used. The springs bear against an annular plate 192 held in place by a retaining ring 194 so that the whole assembly rotates with the hub 186 on which it is mounted. To cause even wear and uniform torsional loading on the cone 188 and hub 186, the cone 188 is interlocked with the hub 186 in the direction of rotation by the dowels 195 in the hub 186 which extend into the grooves 196 on the internal bore on the cone 188. The grooves 196 facilitate movement along the axis of the drive shaft 38 to accommodate the biasing of the cone against ring assembly 164.

Figures 6, 7:
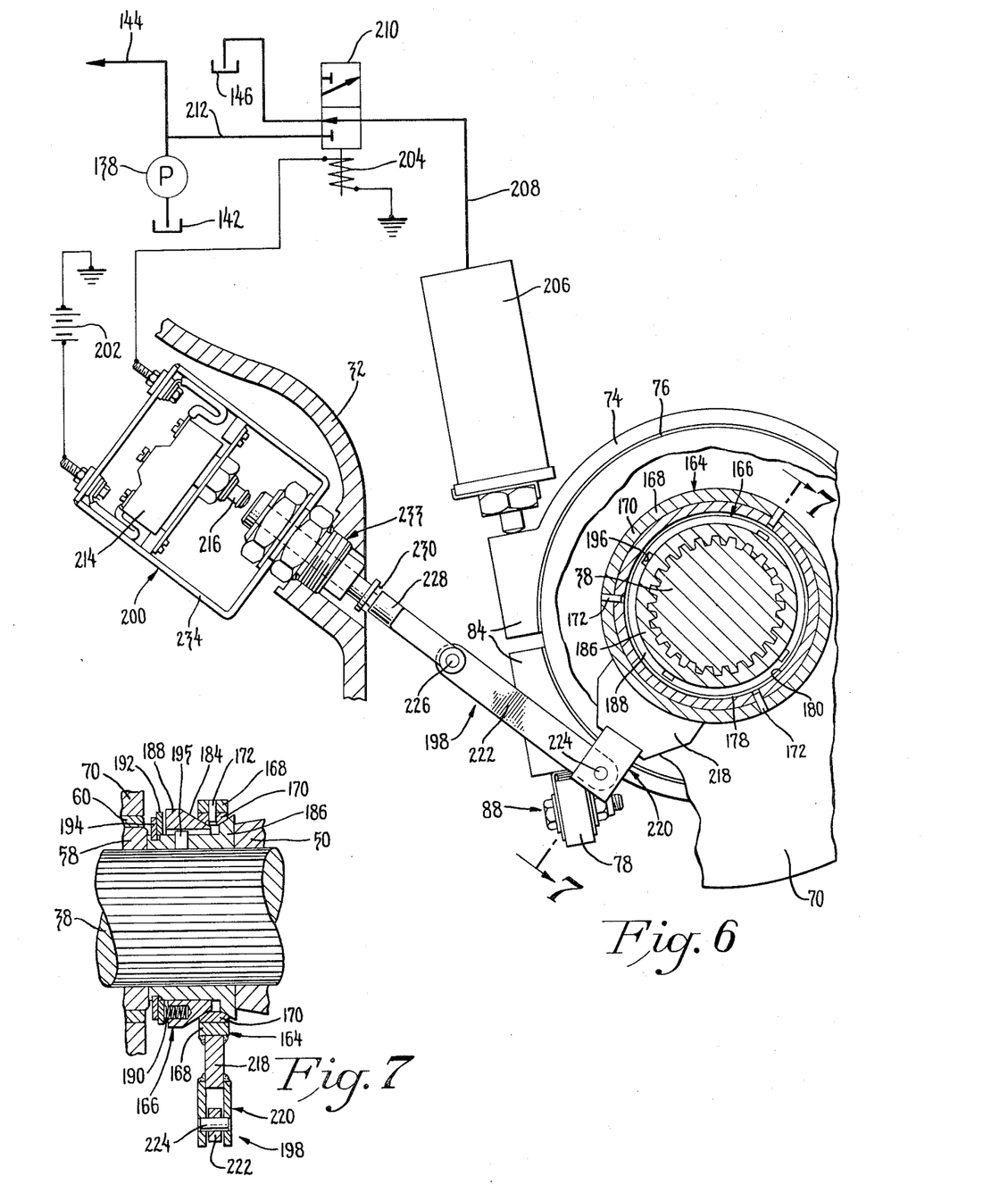
FIG. 6 is a view similar to FIG. 4 showing another embodiment of the present invention including a schematic of alternate controls to that illustrated in FIG. 5.
FIG. 7 is a sectional view of the apparatus illustrated in FIG. 6 taken along line 7—7 thereof.

FIGS. 6 and 7 illustrate an alternate means for controlling the braking system where the clutch having the hub and ring assemblies 166 and 164 is used in combination with an articulated lever 198. The lever 198 actuates the second control element, an electrical switch 200, mounted on the skidder 20. The switch is wired to a power source such as a battery 202 on one side and to a coil 204 on the other side of its circuit with the circuit being completed by a connection to ground of both the battery 202 and the coil 204. Note that for reasons of simplification of illustration only, the actuating means such as a cylinder 206 is shown acting directly on the terminal portions 84 of the band 74. The cylinder 206 is of the single acting type which can be unloaded through a line 208 connected to it and the first control element, a directional valve 210, when the valve 210 is in the position illustrated in FIG. 6. Flow from the pump 138 which could be diverted from line 144 through line 212 is cut off by the valve 210 while the line 208 is interconnected to the sump 146. The cylinder 206 is activated by energization of the coil 204 by the switch 200 to shift the directional valve 210 downwardly closing off the return line to the sump 146 and opening the line 212 to allow flow through line 208 to the cylinder 206.

The switch 200 is a conventional electro-mechanical switch having a contact assembly 214 for making and breaking the electric circuit upon depressing and releasing of the plunger 216. When the ring assembly 164 is frictionally engaged by the hub assembly 166 upon reverse or backward movement of the drive shaft 38, as described above for the embodiment of FIGS. 2, 4 and 5, the lever 198 is caused to depress the plunger 216 on the switch 200 closing the circuit to activate the coil 204 and energize the brake 40.

The lever 198 is affixed to the ring assembly 164 by a plate 218 and has a yoke 220 to receive the bar 222 which is pivotally attached to the yoke 220 by the pin 224. A pin 226 pivotally connects the bar 222 to a rod 228 having a limit stop 230 thereon for engaging the gear box 32 of the skidder 20 to limit travel of the rod 230. The two pivot points at pins 224 and 226 permit the arcuate motion of the yoke 220 to be translated to linear motion of the rod 230 for actuating the switch 200. The rod 230 is suitably supported within the bore of the nut assembly 233 which supports the switch housing 234 and affixes it to the skidder 20.

Figures 8, 9:
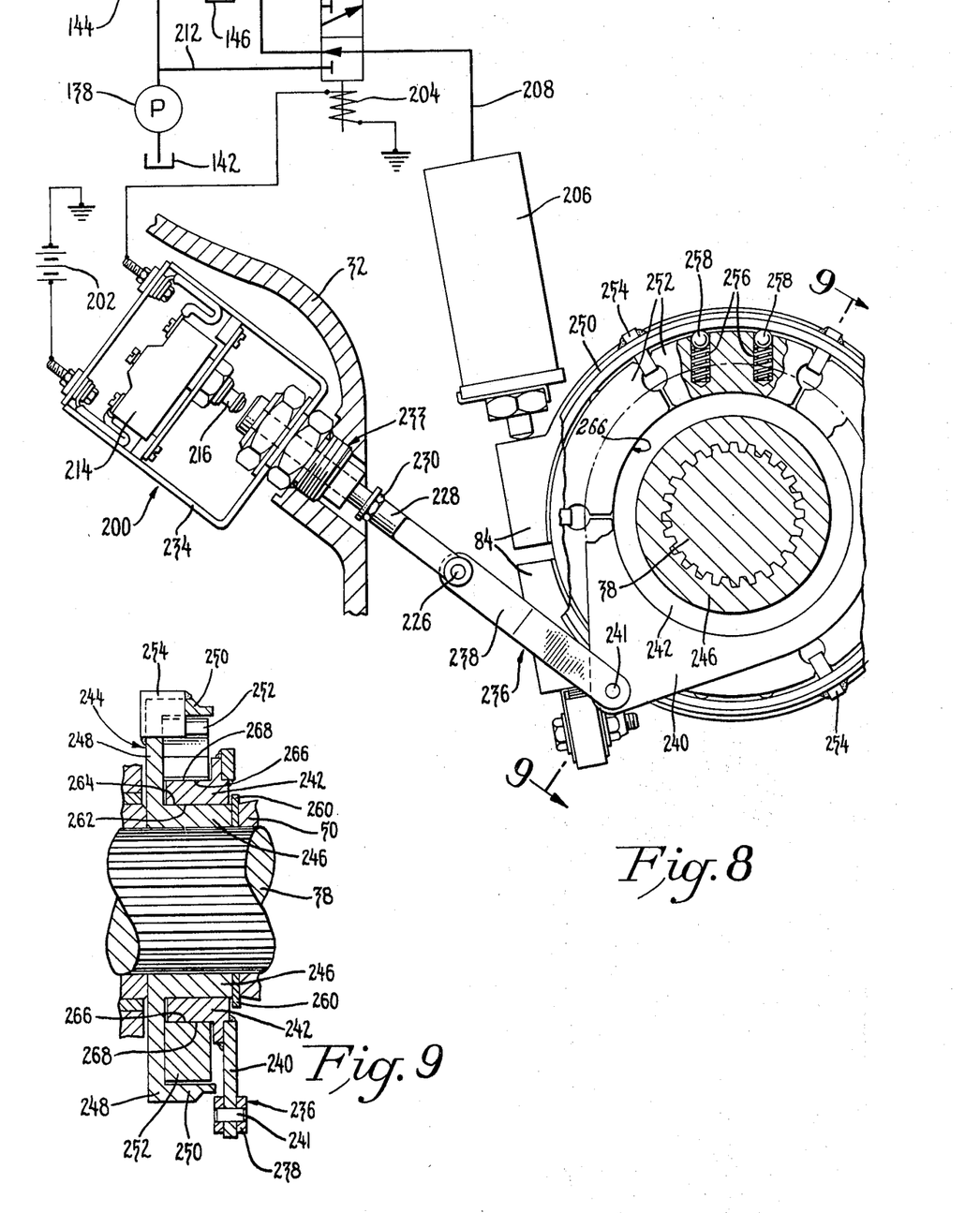
FIG. 8 is an alternate embodiment of the apparatus illustrated in FIG. 6.
FIG. 9 is a sectional view of the apparatus illustrated in FIG. 8 taken along line 9—9 thereof.

FIGS. 8 and 9 illustrate the control means of FIGS. 6 and 7 with an alternate means for positioning the second control element, switch 200, wherein the lever 198 has a yoke 236 attached to the bar 228 as an alternative to attaching the yoke 220 to the plate 218 as illustrated in FIGS. 6 and 7. The yoke 236 is pivotally attached to a plate 240 by a pin 241. Affixed to the plate 240 is a first member, such as ring 242 selectively frictionally engageable with a second member such as a hub assembly 244. The hub assembly 244 includes a hub 246, annular plate 248, outer ring 250 and annular segments 252. The annular segments 252 are maintained in rotational orientation with the hub assembly 244 by a number of guide bars 254 affixed to the outer ring 250. With the hub 246 splined to the drive shaft 38 in a manner similar to that described for the clutch illustrated in FIGS. 2 and 4, the segments 252 are rotated with the hub assembly 244 upon rotation of the drive shaft 38 and are thereby subjected to centripetal forces directed radially outward. A number of springs 256 with ball seats 258 adjacent the inner circumferential surface of the outer ring 250 bias the segments against the ring 242 to provide friction contact between the segment 252 and ring 242 absent a sufficient centripetal force to overcome the bias of the springs 256. A retainer ring 260 is provided to maintain the ring 242 on the hub 246.

It should be noted that the circumferential surfaces 262 and 264 on the outside of the hub 246 and the inside of the ring 242 are bearing surfaces with little, if any, friction while the outer circumferential surface 266 of the ring 242 and inner circumferential surface 268 of the segments 252 are friction surfaces with a high coefficient of friction. Thus, when the drive shaft 38 stops before reversing its rotation from forward to backward motion, the segments 252 frictionally engage the ring 242 to cause the lever 238 to depress the switch 200, upon backward motion of the drive shaft 38, thereby activating the control means to brake the skidder 20 as described for the control means of FIGS. 6 and 7.

The feature of holding the segments 252 in a disengaged position as the drive shaft 38 reaches a preselected speed of rotation, permits the clutch to operate at high speeds without friction between the segments 252 and the ring 242 thereby eliminating heat of friction and wear on the clutch, particularly at high speeds of the drive shaft 38.

Figures 10, 11:
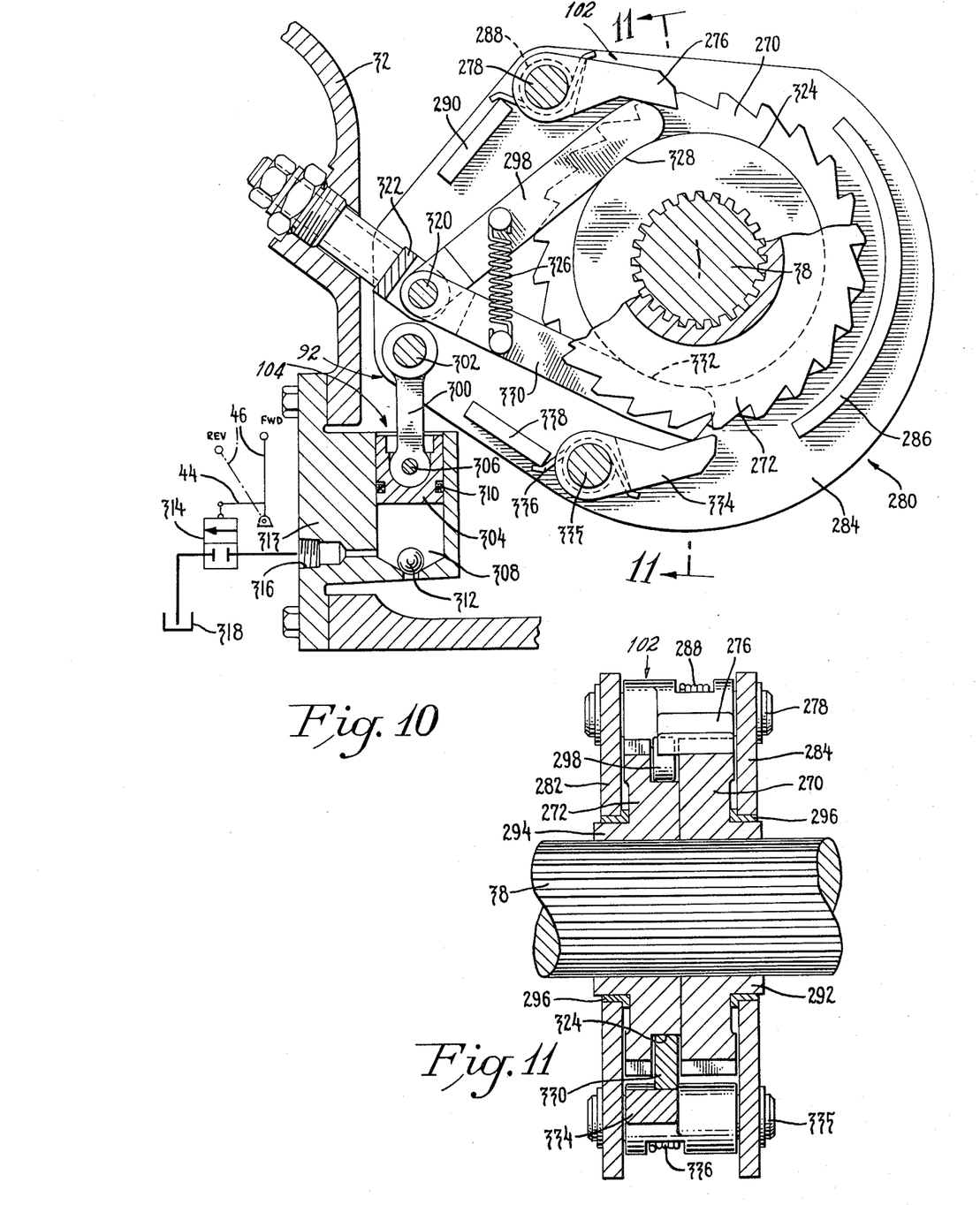
FIG. 10 is an alternate embodiment of the apparatus illustrated in FIG. 3.
FIG. 11 is a sectional view of the apparatus illustrated in FIG. 10 taken along line 10—10 thereof.

An alternate braking system is illustrated in FIGS. 10 and 11. A pair of ratchet wheels 270 and 272 are splined to the drive shaft 38 and rotate with it. The first ratchet wheel 270 in conjunction with a detent, such as the pawl 276, provide means for interrupting the movement of the drive shaft 38 in the reverse direction indicated by the arrow in FIG. 10. The pawl 276 pivots on a pin 278 affixed to a housing 280 having a front and back plate 282, 284 together with an interconnecting plate 286. The pawl 276 is biased toward the ratchet wheel 270 by a spring 288 anchored on a bar 290 affixed to the housing 280.

The housing 280 is supported on the ratchet wheel hubs 292 and 294 by a pair of bearings 296 pressed into the housing 280 and rotatable with respect to the ratchet wheels 270 and 272. The housing 280 together with an arm 298 provide a linkage operatively associated with the interrupting means and responsive to reverse motion of the drive member, drive shaft 38. Movement of the housing 280 is limited by means for engaging the linkage, such as the piston 30 pivotally attached by pin 302 to one end of the piston rod 300 with the other end of the piston rod 300 attached to housing 280 by a pin 306.

Any reverse or backward movement of the skidder 20 is transmitted by the wheels 36 to the drive shaft 38 resulting in the ratchet wheel 270 being engaged by the pawl 276 to transmit the breaking force to the housing 280 through the pin 278 on which the pawl pivots. The housing 280 is rotated counterclockwise, as viewed in FIG. 10, by the braking force which is thereby transmitted to the piston 304 by the piston rod 300 attached to the housing 280. Fluid within the piston chamber 308, preferably oil, is prevented from escaping the chamber 308 by seals 310 on the piston 304 and a ball check valve 312 when the shift lever 46 is in the forward position. Thus, the fluid transmits the braking force to the piston chamber 308 which is integral to the anchor 313 attached to the gear box 32. The shift lever 46 is connected by a linkage 44 to a control element, relief valve 314, which blocks flow from the chamber 308 through port 316 when the shift lever 46 is in the forward position. Only when the shift lever 46 is moved to the reverse position does the relief valve 314 release the brake 40 by allowing the fluid in the chamber 308 to discharge to the sump 318 upon shifting of the valve 314 downward in FIG. 10. Discharging the fluid in the piston chamber 308 permits the piston 304 to move toward the ball check valve 312 thereby rotating the housing 280 counterclockwise, in FIG. 10. The arm 298 which is pivotally mounted by a pin 320 to a stationary mounting 322 on the gear box 32 engages the pawl 276 to lift the pawl 276 out of engagement with the ratchet wheel 270. The shift lever 46 must be in the reverse position to discharge the fluid, and since the pawl 276 is disengaged, the drive shaft 38 may be driven in reverse.

The arm 298 for engaging the pawl 276 is biased against an intermediate face 324 on the ratchet wheel 272 used to cock the brake 40 by a spring 326. The intermediate face has a diameter which is in between that of the hub 294 and the ratchet teeth and positions the arm 298 to engage the pawl 276 with the housing 280 in the position where the piston 304 is adjacent the ball check valve 312 and to disengage from the pawl 276 when the housing 280 is in the position where the piston 304 is at the other end of the piston chamber 308. It should be noted that most of the force required to disengage the pawl 276 from the ratchet wheel 270 is received by the intermediate face 324 through the arm 298 which has a contoured surface 328 for increasing the area of contact between the arm 298 and intermediate face 324 to better enable the arm 298 to transfer the force for disengaging the pawl 276.

The spring 326 biasing the arm 298 is connected between the arm 298 and a mating arm 330 positioned on the intermediate face 324 in a position opposing the arm 298. The mating arm 330 also has a countoured surface 332 and functions in the same manner as the arm 298 described above to disengage a detent, such as cocking pawl 334, as illustrated in FIG. 10. The cocking pawl 334 can only be engaged with the ratchet wheel 272 to cock the brake 40 when the piston 304 is adjacent the ball check valve 312 and the mating arm 330 disengages from the cocking pawl 334.

As forward motion of the drive shaft 38 rotates the ratchet wheel 272 clockwise when the housing 280 is in the release position described above, the cocking pawl 334 is engaged by the ratchet wheel 272 to move the housing clockwise and lift the piston 304 in the chamber 308. As the piston rises, fluid is drawn in through the ball check valve 312 to reset the brake 40.

The cocking pawl 334 being pivotally mounted on a pin 335 affixed to the housing 280 is normally biased toward the ratchet wheel 272 by a spring 336 anchored on a bar 338 affixed to the housing 280.

As the housing 280 rotates clockwise, the mating arm 330 is brought into engagement with the cocking pawl 334 to release the pawl 334 once the brake 40 has been cocked to allow forward rotation of the drive shaft 38. The brake 40 has now been positioned by the cocking pawl 334 ready to repeat the cycle.

In view of the variations in structures embodying the invention and the wide range of their utilization, it should be understood that the above disclosure is merely illustrative and should not be read in a limiting sense. The invention may be practiced otherwise than as specifically illustrated and described without departing from its spirit or scope.

We claim:

1. In a vehicle having a drive member for transmitting power to ground engaging members from an engine for driving the vehicle relative to the ground, a braking system comprising:
   means for interrupting movement of the drive member;
   a linkage operatively associated with said interrupting means, a member of said linkage supported by the drive member so as to be rotatable over a portion of the 360° rotation of the drive member in response to reverse motion of the drive member corresponding to reverse motion of the vehicle, said linkage including a link and a pivotal arm, two ends on said pivotal arm, one end of said pivotal arm being pivotally connected to said linkage and to said link at spaced locations, said link limiting the rotational movement of said linkage member;
   means for actuating said linkage attached to the other end of said pivotal arm; and means for operatively engaging said linkage having at least a portion thereof stationary, for engaging said link for full energization of said interrupting means upon selective engagement of said pivotal arm with said interrupting means for initial energization thereof.

2. The system defined in claim 1 wherein said actuating means is a fluid motor.

3. The system defined in claim 1 wherein said means for operatively engaging said linkage includes an anchor and said anchor is pivotally connected to said link.

4. The system defined in claim 1 wherein said linkage further includes a housing rotatable with respect to the drive member, said one end of said pivotal arm being pivotally connected to said housing, and said actuating means is mounted on said housing.

5. The system defined in claim 1 wherein said one end of said pivotal arm engages said interrupting means and wherein said pivotal connection between said pivotal arm, linkage and link includes a first pivotal connection between said pivotal arm and said linkage and a second pivotal connection between said pivotal arm and said link, said first pivotal connection being located between said second pivotal connection and the engagement of said pivotal arm with said interrupting means.

6. The system defined in claim 5 wherein said pivotal arm has a length between said first pivotal connection and said other end connected to said actuating means greater than the distance between said first and second pivotal connections.

* * * * *